Jan. 20, 1959
A. S. VOLPIN
2,869,942
STEM AND STUFFING BOX CONSTRUCTION FOR
NON-RISING STEM GATE VALVES
Filed March 19, 1956
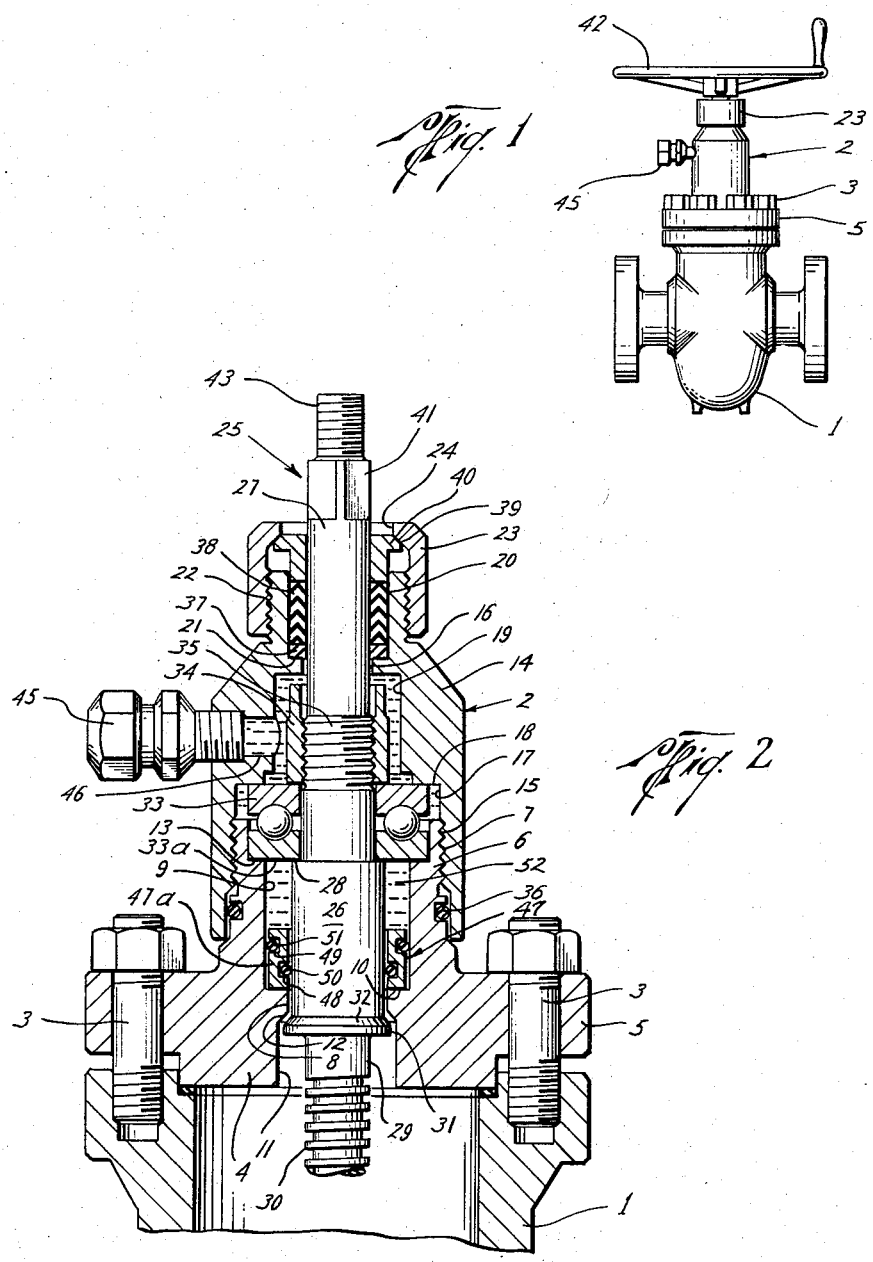
Alexander S. Volpin
INVENTOR.
BY
ATTORNEY

# United States Patent Office 2,869,942
Patented Jan. 20, 1959

2,869,942

STEM AND STUFFING BOX CONSTRUCTION FOR NON-RISING STEM GATE VALVES

Alexander S. Volpin, Miami Beach, Fla.

Application March 19, 1956, Serial No. 572,413

12 Claims. (Cl. 308—187.1)

This invention relates to improvements in gate valves and particularly to improved stem and stuffing box constructions for non-rising stem gate valves.

In non-rising stem gate valves employed to control high pressure fluids such as those produced from high pressure oil and gas wells, compressible packing rings of generally conventional forms are ordinarily employed for sealing about the gate stem. In such high pressure service, particularly where fluid pressures of 3000 p. s. i. or more are encountered, the seal rings are subject to severe and rapid deterioration by the pressure loads thereon, and such deterioration may be greatly intensified where the fluids are of a corrosive nature. The deterioration of the seal rings requires continued tightening or gland pressure thereon, thereby correspondingly increasing the friction load imposed on the stem by the deteriorated packing with consequent increase in the torque requirements for turning the stem to operate the valve.

Moreover, in high pressure service, conventional valve designs seek to reduce the operating torque by employing anti-friction elements such as ball or roller bearings, or the like, which are appropriately installed between the stem and co-acting parts of the valve structure. The employment of such anti-friction elements normally requires substantial increases in the stem diameters and the larger diameter stems necessarily increase the surface areas required to be engaged by the seal rings. Hence, deterioration of the seal rings in such cases further greatly increases the friction load on the stem and the consequent torque requirements for rotating the stem may become so excessive as to cause the valve to require frequent service and repair and in some cases to even become inoperative.

The present invention, therefore, has for its principal object a stem and stuffing box construction for high pressure valves of the kind described which will greatly reduce the torque requirements for their operation under all conditions.

An important object is to provide a stem and stuffing box construction in which the stem area engaged by compressible seal packing is greatly reduced as compared with more conventional valves used under the same service conditions.

A further object is to reduce the torque requirements by employing a stem formed with larger and smaller diameter sections, the outermost section relative to the valve body being the smaller diameter section and being sealed with conventional compressible ring packing, and the innermost section being of relatively larger diameter and sealed by a movable annular barrier seal.

Still aother object is to provide a torque-reducing stem and stuffing box construction employing a stem formed from an inner larger diameter section and an outer smaller diameter section, longitudinally spaced seals about the respective stem sections and a hydraulic sealant filling the space between the seals to prevent leakage and to protect the outer seal from contact with the fluids passing through the valve.

An additional object is to provide a torque-reducing stem and stuffing box construction employing a stem having an outer smaller diameter section and an inner larger diameter section, the space between the larger diameter stem section and the surrounding stuffing box wall being sealed by means of a longitudinally slidable annular barrier seal movable along the larger diameter section between longitudinally spaced limit stop means.

A further object is a stem and stuffing box construction in which the stem is formed with a larger diameter inner section and a smaller diameter outer section, the respective stem sections being separately enclosed by longitudinally spaced stuffing boxes both defined within the bore of the valve bonnet, the outer stem section being sealed by means of compressible packing rings and the inner stem section being sealed by means of a slidable barrier seal.

Other and more specific objects and advantages of this invention will become apparent from the following detailed description when read in conjunction with the accompanying drawing which illustrates one useful embodiment of a stem and stuffing box construction in accordance with this invention.

In the drawing:

Fig. 1 is an elevational view of a gate valve of a generalized form employing a stem and stuffing box construction in accordance with the present invention; and Fig. 2 is an enlarged longitudinal sectional view of the bonnet portion of the valve of Fig. 1 illustrating the details of the stem and stuffing box construction.

Referring to Fig. 1 there is shown a gate valve having a body 1 of any conventional construction designed for high pressure service, the details of the body not being a part of the present invention. Body 1 is fitted with a bonnet, designated generally by the numeral 2, which is releasably secured to body 1 in a suitable manner as by means of stud bolts 3.

Bonnet 2 comprises an inner or base portion 4 adapted to seat in and close body 1, bonnet portion 4 being provided with a circumferential bolt flange 5 through which bolts 3 extend to secure the bonnet to the valve body in the usual manner. Inner bonnet portion 4 is provided with an outwardly extending centrally located neck 6 which is externally threaded near its outer end at 7. Neck 6 and base portion 4 are provided with an axial bore 8 which communicates with the interior of body 1. Bore 8 is counterbored from its outer end to form a stuffing box 9 defined at its inner end by an annular end wall 10, stuffing box 9 being herein termed the inner stuffing box. Bore 8 is also counterbored from its inner end to form the somewhat enlarged bore portion 11 which terminates in a tapered seating surface 12 at its juncture with bore 8. The outer end portion of stuffing box 9 is additionally counterbored for a short distance from its outer end to define the outwardly facing annular shoulder 13. A generally tubular cap 14 forms the outer portion of the bonnet and is provided at its inner end with internal threads 15 adapted to threadedly receive the threaded end of neck 6. Cap 14 is provided with an axial bore 16 co-axial with bore 8. Bore 16 is counterbored from its inner end to form the relatively large diameter bore portion 17 terminating in a downwardly facing shoulder 18 opposing shoulder 13. Extending outwardly from shoulder 18 is a second counterbore 19 somewhat smaller in diameter than bore portion 17. Bore 16 is also counterbored from the outer end of cap 14 to define the stuffing box 20, herein termed the outer stuffing box, terminating at its inner end in the outwardly facing end wall 21. The outer end portion of cap 14 is reduced in external diameter and externally threaded at 22 to receive a sleeve nut 23 having a central opening 24.

Extending through the several bores defined within the portions of bonnet 2 is a gate stem, designated generally by the numeral 25. The gate stem is formed to provide an inner cylindrical section 26 and an outer cylindrical section 27, the outer section being smaller in diameter than the inner section to thereby define an outwardly facing annular shoulder 28 at the juncture of these sections. Inner stem section 26 is provided at its inner end with a reduced diameter extension 29 provided with threads 30 for threaded engagement in the usual manner with a valve gate (not shown), which is reciprocated in the usual manner in body 1 by rotation of stem 25. At the juncture of extension 29 and the inner end of stem section 26 is an annular enlargement 31 defining an outwardly facing tapered shoulder 32 adapted to engage seat 12 and form a metal-to-metal seal therewith when the stem is retracted to a sufficient extent into the bonnet.

Seated about the portion of outer stem section 27 immediately adjacent shoulder 28 is an anti-friction bearing 33, such as a ball bearing, the anti-friction bearing being seated on shoulders 28 and 13 and urged tightly against these shoulders by means of a sleeve nut 34 threadedly mounted about stem section 27 and engaged with a thread section 35 provided on the outer stem section a short distance above shoulder 28. Bearing 33 is additionally held in place by engagement with shoulder 18 in cap 14 when the latter is screwed down over threads 7. An O-ring seal 36 is provided between the outer surface of neck 6 and the inner end portion of cap 14. A washer or "junk" ring 37 is seated in the bottom of outer stuffing box 20 against its bottom or inner end wall 21 and conventional compressible packing 38 is disposed in the stuffing box about outer stem section 27. Packing 38 may be constructed of composition material or compressible metallic material commonly employed in such packings. Packing 38 is compressively urged toward the junk ring 37 by means of the force exerted by an internal shoulder 39 in sleeve nut 23 against the end of a packing gland 40 which extends into the outer end of stuffing box 20 and into engagement with packing 38. The outer end of stem section 27 projects through opening 24 in sleeve nut 23 and is provided with squared surfaces 41 for locking engagement with an operating wheel 42 (Fig. 1) and is also provided externally of squared surfaces 41 with a threaded tip portion 43 adapted to receive a lock nut (not shown) for securing the operating wheel on the stem.

A pressure grease supply fitting 45 of conventional form is threaded into a supply passage 46 extending through the wall of cap 14 into communication with bore portion 19. Slidably mounted in inner stuffing box 9 is a barrier-type seal, designated generally by the numeral 47, comprising a metal ring 47a forming a loose sliding fit between the exterior of stem section 26 and the wall of stuffing box 9. Ring 47a is provided in its inner and outer faces with circumferential grooves 48 and 49, respectively, and resilient O-rings 50 and 51 are seated in the respective grooves and project therefrom into slidable sealing engagement, respectively, with the periphery of stem section 26 and the wall of stuffing box 9. End wall 10 of the inner stuffing box and the lower end face 33a of bearing 33 form longitudinally spaced limit stops for limiting the extent of the travel of the barrier seal in stuffing box 9.

To complete the sealing structure, a suitable lubricant-type sealant 52 is injected through fitting 45 and passageway 46 to fill all of the bore space in bonnet 2 between packing 38 in the outer stuffing box and the barrier seal in the inner stuffing box. The lubricant-type sealant thus introduced forms a hydraulic sealing barrier between the spaced seals 38 and 47 preventing the leakage of fluid through the bonnet along the gate stem and permitting a balanced pressure to be maintained across the barrier seal. Should the sealant leak from the bonnet, the pressure in the valve body will force barrier seal 47 toward the outer stop formed by bearing 33 to an extent corresponding to the reduction in volume of the sealant resulting from the leakage. When the leakage is sufficiently great to allow the barrier seal to engage end face 33 of the bearing, the resulting unbalanced pressure across the barrier seal will compress and expand O-rings 50 and 51 and assure a fluid-tight seal between stem section 26 and the surrounding wall of stuffing box 9, despite the loss of sealant. The greater the differential in pressure, the tighter will be the resulting seal; hence, the described construction will assure the valve against leakage of fluid controlled by the valve under the most severe conditions.

The barrier seal may be returned to its balanced pressure condition by introducing additional sealant through fitting 45 and passageway 46 to the interior of the bonnet in an amount sufficient to force the barrier seal away from stop 33a.

By providing the compressible-type packing only about the relatively small diameter stem section 27, it will be seen that a minimum of surface will be subjected to friction and the torque requirements for rotating the valve stem will be reduced accordingly. Deterioration of the packing by corrosive fluids and excessive pressures will, of course, be greatly obviated by providing the hydraulic sealant in advance of the compressible stem packing in the outer stuffing box. The provision of the slidable barrier seal in the inner stuffing box will very greatly reduce the torque requirements for operating the valve stem, even though the inner section of the gate stem may be made to a relatively large diameter. Under normal conditions the friction load will be extremely small. The only time when the friction load, represented by the expansion of the O-rings, becomes a factor is when leakage of the sealant has permitted the barrier seal to come up against the upper stop and a pressure differential is produced across the barrier seal. This load factor is not likely to be excessive because of the comparatively small areas involved in the sealing contact of the O-rings. Moreover, the pressure differential may be quickly obviated by reintroducing a sealant into the bore of the bonnet and this friction load factor effectively reduced.

From the foregoing, it will be seen that the stem and stuffing box construction hereinabove described provides effective sealing for non-rising stem gate valves while, at the same time, holding to a minimum the torque requirements for rotation of the stem in operating the valve.

It will be understood that various alternations and modifications may be made in the details of the illustrative embodiments within the scope of the appended claims, but without departing from the spirit of this invention.

What I claim and desire to secure by Letters Patent is:

1. A stem and stuffing box construction for non-rising stem gate valves, comprising in combination with a gate valve body, a bonnet member having a generally tubular stuffing box therein, a rotatable gate stem extending axially through said stuffing box, said gate stem comprising coaxial aligned inner and outer cylindrical sections, the inner section being larger in diameter than the outer section, axially spaced-apart inner and outer annular seal means positioned in the stuffing box to seal between the respective stem sections and the surrounding wall portions of the stuffing box, the outer seal means comprising axially compressible packing, the inner seal means comprising a longitudinally slidable barrier seal means, said barrier seal means comprising an annular carrier having resilient O-rings circumferentially seated in its inner and outer peripheries, and a body of a hydraulic sealant interposed in the stuffing box between said inner and outer seal means.

2. A stem and stuffing box construction for non-rising stem gate valves, comprising in combination with a gate valve body, a bonnet member having a generally tubular stuffing box therein, a rotatable gate stem extending axially through said stuffing box, said gate stem comprising coaxial aligned inner and outer cylindrical sections, the inner section being larger in diameter than the outer section, axially spaced-apart inner and outer annular seal means positioned in the stuffing box to seal between the respective stem sections and the surrounding wall portions of the stuffing box, the outer seal means comprising axially compressible packing, the inner seal means comprising a longitudinally slidable barrier seal means, longitudinally spaced stop means limiting the extent of longitudinal movement of the barrier seal means along the inner stem section, the outer one of said stop means comprising an anti-friction bearing means secured between the stem and the stuffing box, and a body of a hydraulic sealant interposed in the stuffing box between said inner and outer seal means.

3. A stem and stuffing box construction for non-rising gate valves, comprising in combination with a gate valve body, a bonnet member having a generally tubular stuffing box therein, a rotatable gate stem extending axially through said stuffing box, said gate stem comprising coaxial aligned inner and outer cylindrical sections, the inner section being larger in diameter than the outer section, compressible packing positioned to form a seal between the smaller diameter outer stem section and the surrounding wall portion of the stuffing box, an annular barrier seal means longitudinally slidably disposed between the larger diameter inner stem section and the surrounding wall portion of the stuffing box to form a slidable seal therebetween, said barrier seal means comprising an annular metallic carrier having resilient O-rings circumferentially seated in its inner and outer peripheries, and a body of a lubricant-type sealant interposed in the stuffing box between said packing and said barrier seal means.

4. A stem and stuffing box construction according to claim 3 wherein longitudinally spaced stops are provided in the stuffing box to limit the extent of longitudinal movement of the barrier seal means along the inner stem section.

5. A stem and stuffing box construction according to claim 3 having means communicating with the stuffing box between the packing and the barrier seal means for introducing said sealant therein.

6. A stem and stuffing box construction for non-rising stem gate valves, comprising in combination with a gate valve body, a bonnet member having a generally tubular stuffing box therein, a rotatable gate stem extending axially through said stuffing box, said gate stem comprising coaxial aligned inner and outer cylindrical sections, the inner section being larger in diameter than the outer section, axially spaced-apart inner and outer annular seal means positioned in the stuffing box to seal between the respective stem sections and the surrounding wall portions of the stuffing box, the outer seal means comprising annular packing means adapted to be radially expandible by axial compression, the inner seal means comprising an annular metallic carrier slidably mounted about the inner stem section and having O-ring seal means circumferentially mounted in the inner and outer peripheries thereof, and a hydraulic barrier interposed in the stuffing box between said seal means.

7. A stem and stuffing box construction for non-rising stem gate valves, comprising in combination with a gate valve body, a bonnet member having a generally tubular stuffing box therein, a rotatable gate stem extending axially through said stuffing box, said gate stem comprising coaxial aligned inner and outer cylindrical sections, the inner section being larger in diameter than the outer section, axially spaced-apart inner and outer seal means positioned in the stuffing box to seal between the respective stem sections and the surrounding wall portions of the stuffing box, the inner seal means comprising a longitudinally slidable barrier seal means, step means in the stuffing box limiting the extent of inward movement of the barrier seal means, anti-friction bearing means positioned about the stem and secured between the wall of the stuffing box and the stem, said bearing means being positioned to form a stop means limiting the extent of outward movement of the barrier seal means along the inner stem section, and a body of a hydraulic sealant interposed in the stuffing box between said inner and outer seal means.

8. A stem and stuffing box construction according to claim 7 wherein said inner seal means comprises a compressible packing radially expandable by axial compression thereof.

9. A stem and stuffing box construction according to claim 7 wherein said barrier seal means comprises an annular metallic carrier having resilient O-rings circumferentially seated in its inner and outer peripheries.

10. A stem and stuffing box construction according to claim 7 having means communicating with said stuffing box intermediate the inner and outer seal means for introducing said sealant into said stuffing box.

11. A stem and stuffing box construction for non-rising stem gate valves, comprising in combination with a gate valve body, a bonnet member having a generally tubular bore therethrough, a rotatable gate stem extending axially through said bore, annular packing elements positioned to seal between axially spaced portions of said stem and the wall of said bore, one of the packing elements comprising a longitudinally slidable barrier seal, said barrier seal comprising an annular carrier having resilient O-rings circumferentially seated in its inner and outer peripheries, and a body of lubricant-type sealant filling the bore space between said packing elements.

12. A stem and stuffing box construction for non-rising stem gate valves, comprising in combination with a gate valve body, a bonnet member having an axial bore defining inner and outer longitudinally spaced stuffing boxes, a gate stem extending through said bore and comprising coaxial aligned inner and outer cylindrical sections enclosed respectively by the inner and outer stuffing boxes, the inner stem section being larger in diameter than the outer stem section, seal means in each of the stuffing boxes forming seals therein about the respective stem sections, and a hydraulic barrier interposed in said bore between said seal means, the inner seal means comprising a longitudinally slidable barrier seal, longitudinally spaced stop means in the inner stuffing box to limit the travel therein of the barrier seal, and the outer one of said stop means comprising an anti-friction bearing means disposed about said stem between the stem sections and secured to the wall of said axial bore.

References Cited in the file of this patent
UNITED STATES PATENTS 2,459,654     Kellogg et al.     Jan. 18, 1949
2,634,087     Hess     Apr. 7, 1953